United States Patent [19]
Morrison et al.

[11] 4,438,785
[45] Mar. 27, 1984

[54] PIPE ENCLOSURE

[76] Inventors: John D. Morrison, 12233 Lake Erie Rd. SE., Calgary, Alberta, Canada, T2J 2Z3; Robert McCheyne, 8307 - 161 St., Edmonton, Alberta, Canada

[21] Appl. No.: 281,560
[22] Filed: Jul. 8, 1981

[30] Foreign Application Priority Data

Jul. 10, 1980 [CA] Canada .................................. 355875

[51] Int. Cl.³ ............................................... F16L 3/00
[52] U.S. Cl. .................... 138/103; 138/111; 138/149; 138/159
[58] Field of Search .............. 138/103, 105, 106, 108, 138/111, 112, 149, 159; 174/101; 285/188

[56] References Cited

U.S. PATENT DOCUMENTS

| | | | |
|---|---|---|---|
| 771,594 | 10/1904 | Wilhelmi | 138/105 |
| 1,325,024 | 12/1919 | Linley | 138/175 |
| 1,585,266 | 5/1926 | Schlafly | 138/159 |
| 1,846,550 | 2/1932 | Gottwald | 138/111 |
| 1,987,405 | 1/1935 | Lundy | 138/106 |
| 4,314,775 | 2/1982 | Johnson | 138/105 |

*Primary Examiner*—John W. Shepperd
*Attorney, Agent, or Firm*—Harold H. Dutton, Jr.; George H. Dunsmuir

[57] ABSTRACT

An insulated pipe enclosure for use above ground includes opposed, internally insulated, generally C-shaped, thin-walled base and cover sections, which are interconnected end-to-end by overlapping one section with the next, each cover and base being interconnected by screws in flanges extending outwardly from each side of the cover and base. The pipes in the enclosure rest on vertically extending supports, which are embedded in the insulation of the base sections.

8 Claims, 4 Drawing Figures

PIPE ENCLOSURE

BACKGROUND OF THE INVENTION

This invention relates to a pipe enclosure, and in particular to an insulated pipe enclosure for use above ground.

There are presently available pipe enclosures for carrying pipes above ground while protecting the pipes from the elements. Such enclosures vary in terms of efficacy and complexity. Several examples of pipe enclosures for use above and below ground are disclosed by U.S. Pat. Nos. 1,092,893, issued to E. M. Campfield on Apr. 14, 1914; 1,325,024, issued to F. H. Linley on Dec. 16, 1919; 1,703,605, issued to R. D. Ballantyne on Feb. 26, 1929; 1,845,836, issued to M. Hauser on Feb. 16, 1932; 2,773,512, issued to M. S. Burk on Dec. 11, 1956; 3,313,321, issued to J. P. Keller on Apr. 11, 1967; and 3,863,679, issued to J. Young on Feb. 4, 1975.

Most of the devices disclosed by the above mentioned patents are somewhat complicated and/or difficult to install. Moreover, once installed in the enclosures, the pipes are virtually unaccessible or accessible only with difficulty. Thus, there exists a need for an uncomplicated pipe enclosure which is easy to install and which permits ready access to pipes enclosed therein.

The object of the present invention is to provide a relatively simple enclosure, which is easy to install above ground, and which permits easy access to any section of enclosed pipe.

BRIEF SUMMARY OF THE INVENTION

Accordingly, the present invention relates to a pipe enclosure for use above ground comprising:
 (a) an elongated casing, including
  (i) a generally C-shaped, upwardly opening base defined by a bottom wall, upwardly and outwardly extending side walls, and outwardly extending flanges on upper free ends of said walls, and
  (ii) a generally C-shaped, downwardly opening cover defined by a top wall, outwardly and downwardly extending side walls, and outwardly extending flanges on lower free ends of said side walls for engaging the flanges on said base to define a closed casing;
 (b) means for releasably interconnecting said base and cover; and
 (c) support means on said base for supporting at least one pipe in said casing.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT(S)

Figure 1:
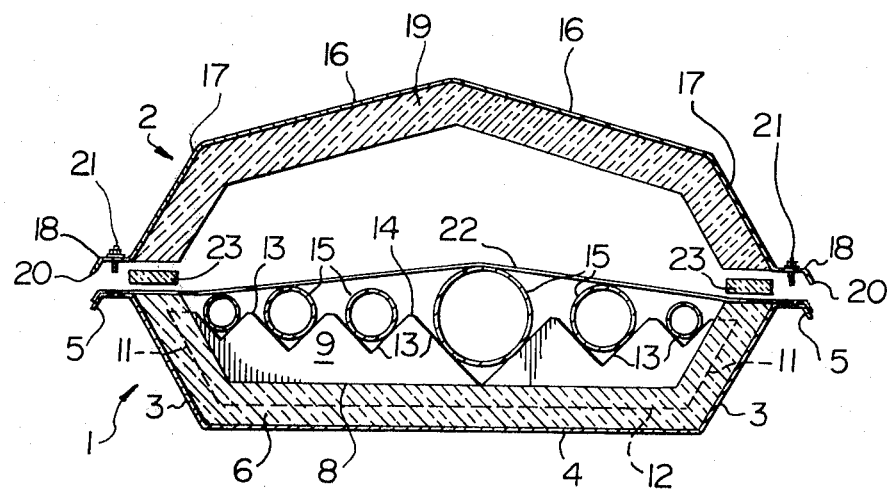
FIG. 1 is a partly exploded cross-sectional view of a first embodiment of a pipe enclosure in accordance with the present invention.
Figure 2:
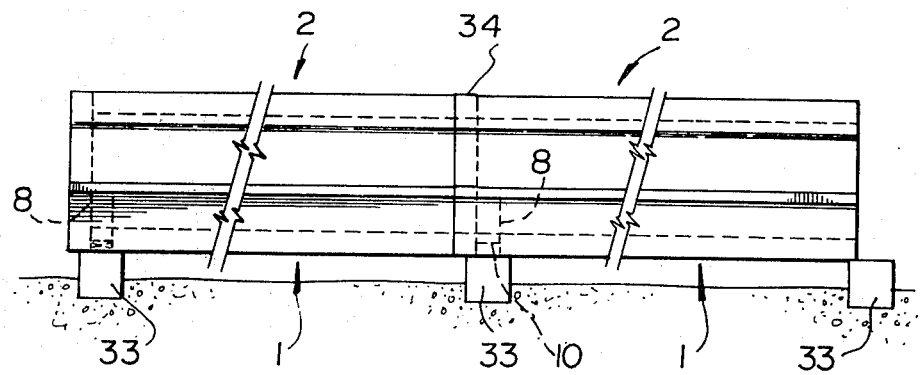
FIG. 2 is an elevation view of a pair of interconnected pipe enclosures in accordance with the present invention.
Figure 3:
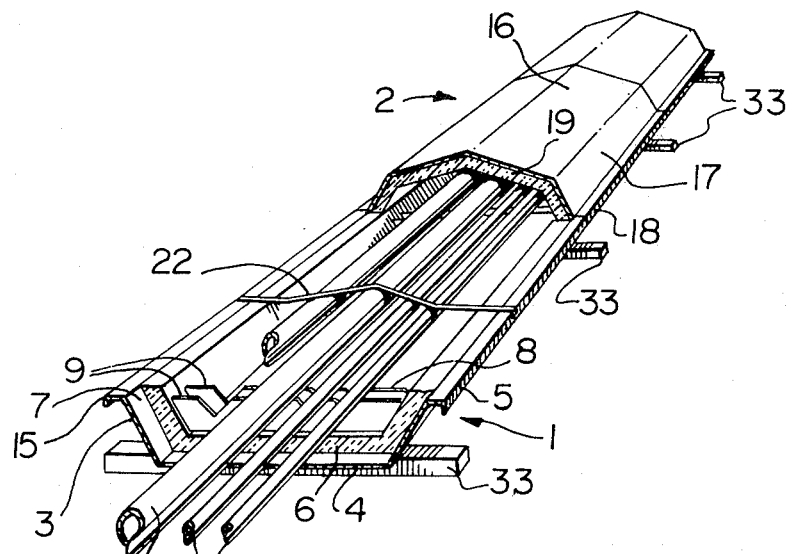
FIG. 3 is a schematic, partly sectioned perspective view from above of a plurality of interconnected pipe enclosures in accordance with the present invention during installation.

With reference to FIGS. 1 to 3 of the drawings, the pipe enclosure of the present invention includes a casing defined by a base generally indicated at 1 and a cover generally indicated at 2. The base 1 and the cover 2 are formed by lengths of sheet metal, i.e., galvanized iron or aluminium. The dimensions of the base 1 and cover 2 are governed by the sizes of pipes to be carried, and by manufacturing, handling and installation considerations. The base and cover are both thin-walled.

The base 1 is generally C-shaped with a pair of upwardly and outwardly inclined side walls 3 interconnected at their lower ends by a planar bottom wall 4, which is integral with such side walls 3. A flange 5 extends horizontally outwardly and then downwardly from the upper free end of each side wall 3 along the entire length of the base. Most of the inner surface of the base 1 is provided with a layer 6 of spray-on type foam insulation. The thickness of the layer 6 depends on the desired R factor. Of course, in warm climes and when carrying a fluid with a low freezing point, the insulation can be omitted. As illustrated in FIG. 3, one end 7 of the base 1 is free of insulation, so that such end 7 can underlap another section of base for interconnecting the sections end-to-end.

A pipe support 8 is embedded in the insulation 6 adjacent one end of the base 1. The pipe support 8 is installed when the insulation is being applied to the base 1. The support 8 includes a pair of vertical, spaced apart plates 9 interconnected by a web of material 10 (FIG. 2) at their bottom ends. Sides 11 and bottom 12 of the plates 9 are parallel to the side walls 3 and the bottom wall 4, respectively of the base 1. A plurality of V-shaped grooves 13 are provided in top edge 14 of the plates 9 for receiving pipes 15.

The cover 2 has a generally C-shaped cross-sectional configuration, including slightly inclined top walls 16, more steeply inclined side walls 17 and outwardly extending flanges 18 on the bottom free end of each side wall 17. The top walls 16 are inclined so that snow slides off the cover 2 of the casing. A layer 19 of insulation is provided on the inner surfaces of the top and side walls 16 and 17 of the cover 2. The insulation stops short of one end of the cover so that such end can overlap an end of another cover to interconnect covers end-to-end. Like the outer edges of the flanges 5, the outer edges 20 of the flange 18 bend downwardly to ensure that rain or snow cannot enter the casing 1. The flanges 5 and 18 are held together by self-tapping metal screws 21. At least one metal band 22 (FIGS. 1 and 3) extends between and interconnects the sides of the casing between the base 1 and the cover 2 for providing lateral strength, so that the casing can support a load of, i.e. snow. A strip 23 of fibreglass or the like is placed between the flanges 5 and 18 for completely insulating the pipes 15 from the atmosphere.

Figure 4:
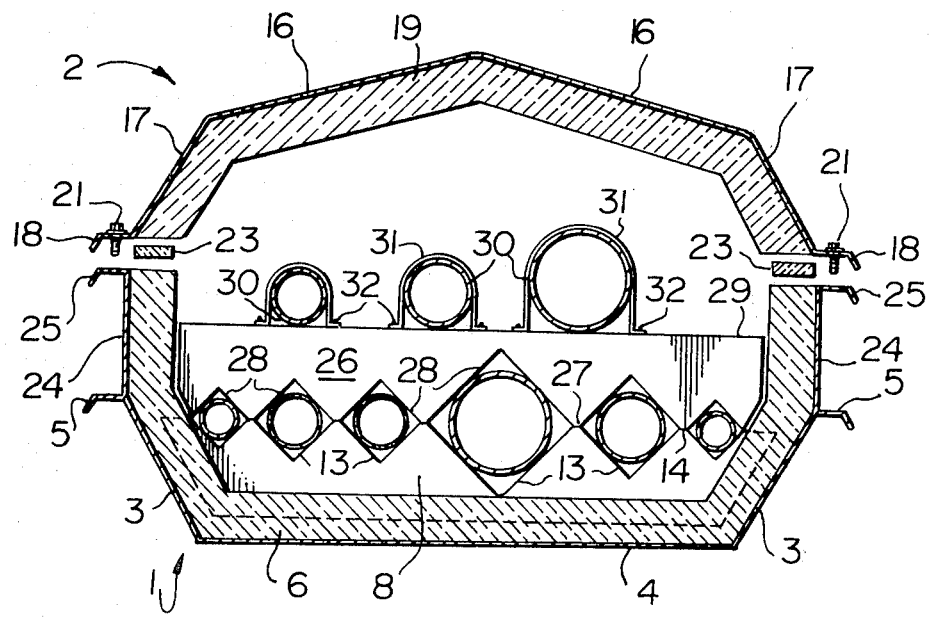
FIG. 4 is a partly exploded cross-sectional view of a second embodiment of the pipe enclosure of the present invention.

Referring now to FIG. 4, a second embodiment of the invention is similar to the enclosure illustrated in FIGS. 1 to 3, except that it supports two layers of pipes. In FIG. 4, wherever possible, the same reference numerals have been used as in FIGS. 1 to 3. In the second embodiment of the invention, vertical extensions 24 are provided on each side wall 3 of the base 1. Flanges 25, similar to the flanges 5, are provided on the upper ends of the extensions 24 for engaging the flanges 18 of the cover 2. The insulation 6 covers the interior surfaces of the extensions in the same manner as it covers the side and bottom 3 and 4.

A second pipe support 26 is provided above and supported by the pipe support 8. The support 26 is essentially a mirror image of the support 8. Bottom edge 27 of the support 26 has inverted V-shaped grooves 28 for receiving the pipes 15, i.e. for permitting the edge 27 to sit on the top edge 14 of the pipe support 8. The top surface 29 of the second pipe support 26 is planar for carrying additional pipes 30. The pipes 30 are retained on such top surface 29 by brackets 31 and screws 32.

In use, lengths of base 1 are placed above ground on transversely extending supports 33. For maximum strength, the supports are provided at least at each end of each base 1, i.e. at junctions 34 formed by overlapping lengths of bases 1 and covers 2. Then, the pipes 15 are placed on the supports 8 (and in some cases on supports 26, which are placed on the supports 8 over the pipes 15), and the bands 22 are placed in position between the flanges 5. Finally, the covers 2 are placed on the bases 1 and secured in position to complete the enclosure.

It is readily apparent that elbows, tees, "Y" sections and other enclosures can be constructed using the foregoing teachings. The insulation having the desired R factor can be applied to the base 1 during manufacture or in the field. Different types of insulation can be used.

With the enclosure described above, it is relatively easy to gain access to any section of enclosed pipe. Because the joints between sections are lap joints, no special alignment of sections is required as is the case, for example, with joints between enclosures having radially extending end flanges, which includes holes for receiving bolts.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example equivalent elements may be substituted for those illustrated and described herein, parts may be used independently of the use of other features, all as will be apparent to one skilled in the art after having the benefits of the description of the invention.

What we claim is:

1. A pipe enclosure for use above ground comprising:
   (a) an elongated casing, including
      (i) a generally C-shaped, upwardly opening base defined by a bottom wall, upwardly and outwardly extending side walls, and outwardly extending flanges having downwardly turned edges on upper free ends of said side walls, and
      (ii) a generally C-shaped, downwardly opening cover defined by a top wall, outwardly and downwardly extending side walls, and outwardly extending flanges having downwardly turned edges on lower free ends of said side walls for engaging the correspondingly shaped flanges on said base to define a closed casing;
   (b) means for releasably interconnecting said base and cover;
   (c) insulation on the interior of said base and said cover, and
   (d) first support means having a U-shaped cross section and supported by the insulation in said base and spaced from said base for supporting at least one pipe in said casing and spaced from said casing by said insulation.

2. A pipe enclosure according to claim 1, wherein said base and cover are metal, and wherein said base and cover are adapted to be connected end-to-end with other bases and covers by overlapping adjacent bases and covers.

3. A pipe enclosure according to claim 2, including at least one end of each base and cover having a portion thereof free of insulation for overlapping said one end with an adjacent base or cover.

4. A pipe enclosure according to claim 3, wherein the said top wall of said cover includes a pair of outwardly and downwardly inclined sides, whereby snow can slide from said top wall.

5. A pipe enclosure according to claims 1, 2 and 3, including band means for extending transversely of the casing between the flanges of said base and cover for increasing the lateral strength of the casing.

6. A pipe enclosure according to claim 1, wherein said first support means is U-shaped in cross-section, and extends transversely of said base, said first support means including a pair of sides with V-shaped pipe-receiving grooves in the upper edges thereof.

7. A pipe enclosure according to claim 6, including second support means for mounting on said first support means for supporting at least one additional pipe in said casing.

8. A pipe enclosure according to claim 7, wherein said second support means is substantially a mirror image of said first support means.

* * * * *